United States Patent [19]

Crihan

[11] 4,246,295
[45] Jan. 20, 1981

[54] STERILIZATION AND STRUCTURAL REINFORCEMENT OF ART OBJECTS MADE OF ORGANIC MATERIAL

[76] Inventor: Ioan G. Crihan, 417 E. 64th St., #4G, New York, N.Y. 10021

[21] Appl. No.: 942,664

[22] Filed: Sep. 15, 1978

[51] Int. Cl.³ .......................... B05D 3/06; A61L 1/00
[52] U.S. Cl. ...................................... 427/36; 422/22; 427/44
[58] Field of Search ................. 422/22; 427/4, 13, 36, 427/44, 140, 296, 297; 428/481; 250/431 R, 432 R, 492 B, 455

[56] References Cited

U.S. PATENT DOCUMENTS

| | | | |
|---|---|---|---|
| 2,904,392 | 9/1959 | Pomerantz et al. | 422/22 X |
| 3,077,415 | 2/1963 | Kenaga | 204/159.12 |
| 3,549,509 | 12/1970 | Casalina | 204/189.2 |
| 3,669,727 | 6/1972 | Raymond | 260/850 X |
| 3,698,925 | 10/1972 | Salz et al. | 427/140 |
| 3,779,706 | 12/1973 | Nablo | 422/22 |
| 3,892,884 | 7/1975 | Garratt et al. | 427/36 |

FOREIGN PATENT DOCUMENTS

| | | | |
|---|---|---|---|
| 286197 | 1/1971 | U.S.S.R. | 427/297 |
| 289914 | 2/1971 | U.S.S.R. | 427/297 |

*Primary Examiner*—Ronald H. Smith
*Assistant Examiner*—Thurman K. Page
*Attorney, Agent, or Firm*—Horace S. Harper

[57] ABSTRACT

A method for treatment of an organic material containing art object, such as a wood carving, a painting on wood or canvas, a textile hanging or a tooled leather saddle, for preservation and restoration thereof. The method includes the steps of partially impregnating the art object with an unsaturated resin and exposing the partially impregnated art object to a large dose of radiation to polymerize the resin, without addition of any catalysts and without the production of any significant exothermic reaction. The polymerized resin strengthens the art object and the radiation sterilizes the art object, destroying insects, molds, and other destructive biological vectors.

6 Claims, No Drawings

STERILIZATION AND STRUCTURAL REINFORCEMENT OF ART OBJECTS MADE OF ORGANIC MATERIAL

SUMMARY OF INVENTION

In the preservation and restoration of organic material containing art objects a number of expedients are already well known.

For example, it is well known to neutralize acid traces in drawings on paper by immersing the drawings in a weak magnesium carbonate solution saturated with carbon dioxide, and then carefully drying the drawings. Such treatment will neutralize acid present in the paper and will largely guard against future deterioriation.

However, when deterioration has already occurred, the restorer faces difficulties. Even if the further acid hydrolysis of the cellulose and if the external appearance of art object is restored to its original state, the internal strength of the material may be so damaged as to prevent exhibition. For example, a textile hanging could be restored by reweaving small portions thereof with the same type of threads and yarns, in the same size, color, texture and touch as used in the original, but te restored hanging might have too little internal strength to permit it to be hung for an exhibition.

It is an object of the instant invention to strengthen organic material containing art objects by incorporating into the material of the object a small amount of an unsaturated resin, which is polymerized in situ by irradiation with large amounts of ionizing radiation, such as x-rays, gamma rays, beta rays or high speed electrons from an electron accelerator. No catalyst or accelerator is utilized to accomplish the polymerization, and therefore damage to the art object by highly reactive catylists or accelerators, such as organic peroxides, is avoided. The ionizing radiation not only polymerizes the unsaturated resin, but also sterilizes the art object by killing any living worms, insects eggs, molds, mildew, fungi, spores, or other biological vectors.

The nature of the resin utilized in the practice of the invention depends upon the nature of the organic material containing art object.

If the art object is a tapestry or dress which should have some degree of flexibility, so that it can drape naturally, a low impregnation with an unsaturated silicone resin can be used. The cured resin is very pliable and, because of both the pliability and the low amount of impregnation, the feel or hand of the fabric is not materially changed. The low impregnation, however, strengthens and consolidates the fibers.

If the art object is a painting on canvas, where the painting itself is stiff and not subject to folding and draping, a styrene/unsaturated polyester resin or a methyl methacrylate monomer can be used. The cured resin has a stiffness appropriate to that of the art object.

In the case of art objects made of cellulose materials, such as etchings, points and delicate wood carvings, the resin can be a polyester resin, in which case a graft polymerization between the cellulose and the copolyester resin takes place, producing a molecular bond between the cellulose and the resin.

The kind of radiation utilized to produce the polymerization depends on the nature of the art object.

If the art object is three dimensional, a source of penetrating radiation can be used, as this ensures that the interior of the object will get sufficient exposure. Such radiation is most conveniently supplied by a gamma ray source such as a Cobolt[60] source (the most common type) or other radioactive isotope source, or from an industrial X-ray generator.

If the art object has little depth in one direction, as in the case of a flat painting on canvas, a source of lesser penetration can be used. Such a source would be a radioactive beta emitter or an electron accelerator biased by a high voltage source such as a Van der Graff generator.

From the foregoing, it is evident that the resin used in the new process is utilized as a binding agent to consolidate the material of the object into a stronger structure. The binding may be within a single substance, such as a sheet of paper, or it can be between different substances, such as flakes of paint and the wood panel substrate from which they have loosened.

DETAILED DESCRIPTION

Three embodiments of the invention in practice will now be described under headings set forth below.

TAPESTRY

The tapestry is first restored to its original state as much as possible by utilizing a skilled rug restorer to replace a reweave any missing portions of the tapestry, utilizing threads and yarns which duplicate the original in all pertinant characteristics. These characteristics include color, size, material, twist and lay of the threads and the yarns. Many of the threads and yarns will have to be made up from raw materials and natural dyes for the specific repair. It is noted that skilled artisans, who restore burns and tears in expensive clothing and rugs, can be located in the classified telephone directories under a heading such as "Weaving and Mending" and "Carpet and Rug Reweaving". Such artisans have the necessary skills, qualifying them to work on the analogous task of restoring a damaged, precious tapestry, under the direction of a conservator.

The tapestry is then carefully cleaned by use of a mild solvent, such as a highly purified straight chain paraffinic oil which is chemically neutral, which will completely evaporate at temperatures which will not injure the tapestry, and which will not break down or react to form deleterious products. Chlorinated dry cleaning solvents should be avoided because of the chlorine content and ordinary Stoddard dry cleaning solvent should be avoided because it does not completely evaporate at room temperatures.

If the tapestry will be hung in a public hall, it must be protected from moths, and a suitable mothproofing can be given as part of the cleaning operation. A prefered treatment is with "Eulan CN", which is an anionic agent containing, as the active ingredient, sodium pentachlorodihydroxytriphenyl methane sulfonate. This treatment provides a permanent mothproofing and is compatible with natural fibers, natural dyes, acid or chrome dyes and with anionic and non-ionic surfactants. Although this treatment is not compatible with basic dyes, cationic surfactants or albumin based sizes and leveling agents, these last named items are infrequent and are not found in antique tapestries.

The cleaned and repaired tapestry is then subjected to a low impregnation of a highly purified unsaturated silicone resin. It is prefered to utilize a grade of silicone resin which is government-approved for the making of items in contact with food or living tissue, such as the flexible tubing used in liquid food packaging equipment of surgical implants.

The resin is applied in a measured and uniformly distributed manner to the tapestry, preferably by being applied in separate measured amounts to separately measured sub-areas of the tapestry, either by careful brushing or by a spray technique.

The tapestry is permitted to be at rest for a time, during which the resin migrates to produce a uniform impregnation. It has been found that if the tapestry is subjected to a rough vacuum, such as that provided by a Boekel water aspirator or a mechanical fore pump, either immediately before or during the impregnation, that the resin is absorbed more rapidly and uniformly.

Once impregnated, the resin is polymerized in situ by application of ionizing radiation. The total exposure to radiation is adjusted to about 5000000 RAD, and is supplied by a radioisotope. A convenient isotope to use a Cobalt$^{60}$, since the isotope is in regular use for industrial X-raying of heavy metal welds, so that, for a single use, it is both possible and cheaper to rent the source rather than to purchase it. If a source is to be purchased, another isotope, of lesser penetrating power, and possibly shorter half life, might be preferable, as determined by factors such as the cost of the isotope needed to give the required exposure within an economical period, and the expected length of use of the isotope before it is returned for burial.

The polymerized silicone resin acts to consolidate and bind together the fibers of the tapestry with a soft and yielding bond. It is important that the resin have a considerably lower Young's modulous than do the fibers of the tapestry. Thus, when the fabric is handled, the fibers are not subject to a point like concentration of stress, but, instead, the stress is distributed across the entire extent of the fiber-resin interface. This avoids the problems which would be met with a strong rigid adhesive, which would split and render appart the weaker fibers.

If the tapestry is so weakened that it is apt to break from handling, despite the impregnation, it can be supported between two layers of undyed and unsized silk crepeline or organdy, stitched to each other, through the tapestry, with silk thread. The support thus provided is almost invisible. However, the support thusly provided is pointlike in nature, that only those points that which the two layers of silk are stitched to each other, thus creating points of increased stress on the weakened tapestry. It is therefore preferable to provide a more uniform support, by adhering the fabric of the tapestry to a backing of fiberglass cloth, utilizing a suitable adhesive of the type commonly used by conservators in museums. The adhesive can be a thermoplastic one based on beeswax, such as are routinely used to reline paintings on canvas, or it can be based on a synthetic resin.

OIL PAINTING ON CANVAS

The general procedure in treating an oil painting is analogous to that of the tapestry, described above. However, because the canvas on which an oil painting lies is almost pure cellulose, while tapestries usually have only a minor amount of cellulose, and because the canvas of oil paintings is, unlike a tapestry, not subject to much bending or folding, a different resin is used.

Initially the painting is cleaned and then restored at least in part. If there is a severe problem of exfoliation of the paint, it is advisable to reserve the restoration of the original appearance to the last.

The painting is then turned face down on a table, adapted for use as a vacuum table, onto a new sheet of parting material, such as Mylar film. It is advisable to wax the film before use with a tiny amount of hard wax which is then polished away with clean cloths, in the same manner that the professional photographer waxes and polishes his ferrotype tins. This will prevent any sticking of the fragile paint surface to the film on the table during subsequent treatment.

Any previously applied lingings at the back of the painting are then removed. In the case of some old paintings, linings have been added at various times so that in some instances the canvas layers are almost a centimeter thick.

The exposed original canvas is cleaned on its back face in preparation for application of the resin.

The resin used in this instance is a low impregnation of an unsaturated purified polyester resin. This resin has the property that when it polymerizes under the action of ionizing radiation, it will not only link up with itself but it will also graft-polymerize by linking polyester molecules to cellulose molecules. The resin is applied to the cleaned back face of the original canvas, and then polymerized, using the same technique as used with the tapestry.

The polyester resin can be assisted, in its migration within the oil paint layers and canvas of the painting, by pulling a vacuum on the table, before the ionized radiation is applied, holding the vacuum for a period, and then releasing the vacuum.

Before lifting the impregnated painting off the parting sheet, it is advisable in some instances to apply a supporting lining, utilizing standard museum techniques. The fact that the painting is on a vacuum table assists in the application of the lining.

After the painting is pulled off the parting sheet, the paint and original canvas are found to be consolidated and structurally stronger than before. The amount of polyester used is not sufficient to change the sheen of the painting surface.

Final restoration of the face of the painting to its original appearance, if necessary, is then made.

WOOD CARVING

A wood carving which has suffered insect and mold attack and contains some spongy and rotten parts presents problems because of the three-dimensional arrangement of differently affected parts.

After the surface of the carving has been restored to its original appearance as much as possible, the carving is impregnated with a mixture of styrene/unsaturated polyester resins, or a methyl-methacrylate monomer. A prefered way to do this is by immersion and vacuum impregnation. In the case of very large carvings, such as totem poles, vacuum impregnation may be impossible and injection of the resins through bored holes or brushing of the resin is used.

The excess resin is thereafter removed by careful wiping with cloths and repeated dusting with fine dry sawdust, so that the carving finally is returned to its just-previously restored appearance. That is, no excess resin produces any sheen of its own on the surface of the wood carving.

The wood carving, at this stage, is subject to ionizing radiation to polymerize the resin impregnation, thereby restoring strength and integrity to damaged areas.

I claim:

1. In the method of sterilizing and structurally reinforcing art objects selected from the group consisting of tapestries, oil paintings on canvas, and wood carvings, the art object being made of an organic material having biological vectors present, the steps of:

positioning said art object face down on a vacuum source and applying a vacuum, partially impregnating said art object by applying an unsaturated resin in an area of said art object to be reinforced while the vacuum is being applied to draw said unsaturated resin to a desired depth in said art object, polymerizing said resin in situ by subjecting the art object and the unsaturated resin impregnant to a dose of ionizing radiation sufficient to polymerize said resin and sufficient to kill any biological vector in said art object.

2. The method of claim 1 in which the dose of ionizing radiation is approximately 5000000 RAD, of radiation emitted by a radioactive isotope.

3. The method of claim 2 in which the radioactive isotope is Cobalt$^{60}$.

4. The method of claim 1 in which the art object includes a significant portion of cellulose.

5. The method of claim 4 in which the resin is an unsaturated resin which will graft-polymerize to cellulose.

6. The method of claim 5 in which the unsaturated resin is an unsaturated polyester.

* * * * *